July 5, 1966

J. C. McEWEN 3,259,440

RAILROAD JOURNAL BEARING

Filed Nov. 1, 1962

INVENTOR.
John C. McEwen
BY
G. N. Shoupo
ATTORNEY

July 5, 1966   J. C. McEWEN   3,259,440
RAILROAD JOURNAL BEARING
Filed Nov. 1, 1962

INVENTOR.
John C. McEwen
BY
ATTORNEY

United States Patent Office 3,259,440
Patented July 5, 1966

3,259,440
RAILROAD JOURNAL BEARING
John C. McEwen, Indianapolis, Ind., assignor to General Motors Corporation, Detroit, Mich., a corporation of Delaware
Filed Nov. 1, 1962, Ser. No. 234,681
7 Claims. (Cl. 308—37)

This invention relates to an assembly having a means for incrementally rotating a sleeve supporting a rotating cylindrical member in response to a reversal in the direction of rotation of the cylindrical member. In particular, the invention pertains to a journal bearing assembly having such a construction, thereby insuring that the maximum load-carrying areas of the bearing will change periodically during operation.

The journal bearing assembly of the present invention is particularly useful for railway cars and the like where the problem of uneven bearing wear is encountered. In accordance with this invention a sleeve bearing is gradually worn evenly throughout its entire bearing surface rather than being selectively worn as is true with a non-rotating bearing. A bearing assembly of this type has greatly improved durability.

The railroad industry and other industries employing journal bearing assemblies have long encountered the problem of bearing failure due to the uneven wearing of the journal-contacting surfaces of bearings. In many journal bearing assemblies the load components due to gravity and torque are not evenly distributed over the load bearing surfaces of the bearing, resulting in uneven wear of these surfaces. The upper journal-contacting surface of the bearing almost entirely supports the gravitational load. Hence, with a non-rotating bearing, this surface wears appreciably faster than the diametrically opposite surface of the bearing. This uneven wear of the bearing increases the amount of maintenance work required, which raises operation costs and frequently results in costly operational delays.

It is therefore a primary object of my invention to provide a means by which a sleeve bearing may be rotated in a journal bearing assembly in response to a reversal in the direction of journal rotation, thereby insuring that the maximum load-carrying areas of the bearing will change periodically during operation. Another object of my invention is to improve the durability and wearing qualities of a journal bearing, thereby increasing the life of the bearing and reducing installation and maintenance costs. Another object of my invention is to provide a means by which a bearing is worn over its peripheral surfaces as opposed to the selective wearing of the surfaces of a non-rotating bearing.

The above and other objects of my invention are attained with a journal bearing assembly having a stationary housing with a rotatably supported annular sleeve bearing positioned therein. The sleeve bearing is positioned coaxially around a journal portion of an axle which is rotatably supported therein. A camming element or flex sprag and spring means are positioned within an opening extending radially through the annular wall of the bearing. The camming element or flex sprag is adapted to frictionally engage the housing, journal and bearing and incrementally rotate the sleeve bearing relative to the housing in response to a reversal in the direction of rotation of the journal. Thus the rotation of the bearing changes the maximum load-carrying surfaces of the bearing element periodically during operation.

Other objects and advantages of my invention will more fully appear from the following detailed description, reference being made to the accompanying drawing, in which.

Figure 1:
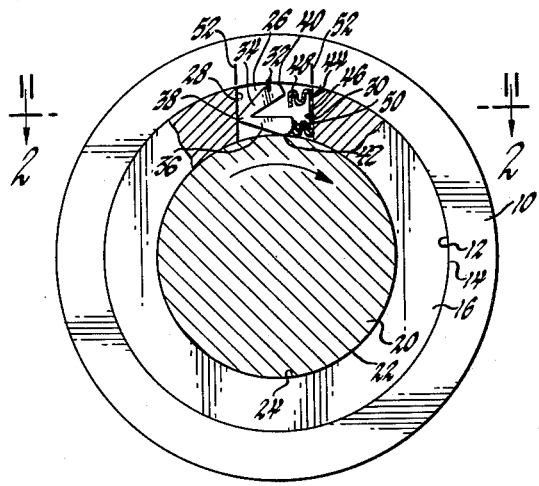
FIGURE 1 is a transverse sectional view of a journal bearing assembly embodying the present invention wherein the journal is rotating in a clockwise direction and the flex sprag is in a relatively static position.

Referring more specifically to FIGURE 1 of the drawing, a journal bearing assembly embodying the present invention is shown as having a stationary housing 10. The housing 10 has a smooth inner cylindrical surface 12 which is in circumferential contact with the outer cylindrical surface 14 of an annular sleeve bearing 16. Thus the sleeve bearing is supported within the housing in a manner which permits incremental rotation of the bearing when sufficient force is applied to it in a circumferential direction. An axle having a journal portion 20 is coaxially aligned with and rotatably supported within the sleeve bearing 16 so that the outer cylindrical surface 22 of the journal is in circumferential contact with the inner cylindrical surface 24 of the sleeve bearing.

Figure 2:
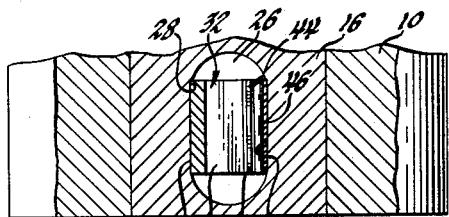
FIGURE 2 is a cross-sectional view along the line 2—2 of FIGURE 1.
Figure 4:
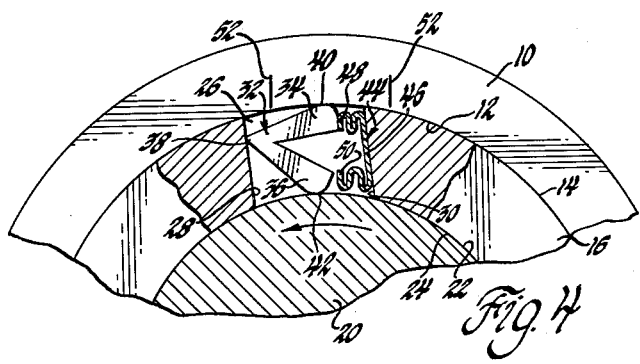
FIGURE 4 is an enlarged fragmentary transverse sectional view similar to FIGURE 3 wherein the journal is rotating in a counterclockwise direction and the flex sprag is in a relatively static position.

As shown in FIGURES 1 and 2, an opening 26 extends through the annular wall of the sleeve bearing 16 in a generally radial direction relative to the bearing between the inner cylindrical surface 12 of the housing 10 and the outer cylindrical surface 22 of the journal 20. A flexible metal V-shaped flex sprag or camming element 32 is positioned in the opening. The flex sprag has two legs 34 and 36 meeting at an apex 38. This apex is in constant sliding frictional contact with a flat, axially extending bearing wall 28 formed by the opening 26. The outermost edge 40 of leg 34, hereinafter designated as the upper leg, is in constant sliding frictional contact with the inner cylindrical surface 12 of the housing 10. The outermost edge 42 of leg 36, hereinafter designated as the lower leg, is in constant sliding frictional contact with the outer cylindrical surface 22 of the journal 20. The distance between the edges 40 and 42 is greater than the radial thickness of the annular wall of the bearing 16. Since the flex sprag is adapted to be moved between two non-binding positions, as shown in FIGURES 1 and 4, by pivoting in the opening, the upper leg 34 and the lower leg 36 are resiliently compressed during the pivoting of the flex sprag in response to a reversal in the direction of journal rotation. Maximum compression occurs, of course, when the two edges 40 and 42 are in radial alignment with respect to the journal and bearing. The edges 40 and 42 are rounded to reduce friction between these edges and the surfaces they contact, thereby facilitating pivoting of the flex sprag.

A spring 44 is positioned in the opening 26 in abutment with the axially extending wall 30 opposite the wall 28 of the bearing. While the spring shown in the drawing is a generally U-shaped sheet steel spring, any spring means adapted to function in the manner hereinafter described is within the scope of the present invention. The spring 44 shown in the drawing has a flat central portion or base 46 in contact with the wall 30 and two fingers 48 and 50, hereinafter designated as the upper and lower fingers respectively, which project generally perpendicular to the base 46. Each of these fingers is further bent into a sinusoidal configuration so that they are resiliently compressible in a direction generally perpendicular to the flat base of the spring. The fingers 48 and 50 of the spring member have generally the same degree of compressibility and are substantially more flexible than the legs 34 and 36 of the flex sprag 32.

Referring again to FIGURE 1, it will be seen that the axle and journal are rotating in a clockwise direction. Index marks 52 are shown on the housing 10 aligned with the walls 28 and 30 of the bearing 16 defining the opening 26. These marks are shown to indicate the relative movement of the bearing with respect to the housing in response to a reversal in the direction of journal rotation.

When the journal 20 is rotating in a clockwise direction, the outer cylindrical surface 22 of the journal frictionally engages the rounded edge 42 of the lower leg 36 of the flex sprag 32 and urges this leg against the lower finger 50 of the spring 44. The lower finger 50 of the spring is thereby compressed so that it absorbs the force exerted by the lower leg 36 of the flex sprag against it, and the bearing remains stationary relative to the housing. The flex sprag 32 in this position rests at an angle in the opening so that the edge 42 of the flex sprag in contact with the outer cylindrical surface of the journal is ahead of the edge 40 in contact with the inner cylindrical surface 12 of the housing 10 in the direction of journal rotation. Hence, the flex sprag in this angular position is in a non-binding, non-compressed condition. However, the force exerted by the compressed lower finger 50 of the spring against the lower leg 36 of the flex sprag keeps the apex 38 of the flex sprag in constant sliding frictional contact with the wall 28 of the bearing. Since the flex sprag is substantially less elastic than the spring, the flex sprag will remain in a non-compressed condition in the position described above when the journal is rotating in a clockwise direction. However, the spring will maintain the edges 40 and 42 and the apex 38 of the flex sprag in constant sliding frictional contact with the corresponding surfaces 12, 22 and 28 respectively, while the journal is rotating.

Figure 3:
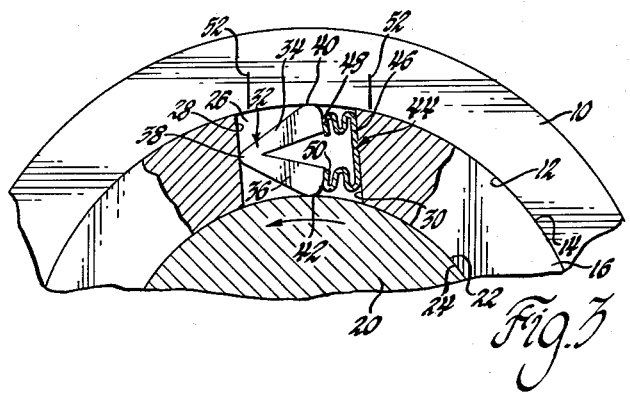
FIGURE 3 is an enlarged fragmentary transverse sectional view of the assembly shown in FIGURE 1 wherein the journal is rotating in a counterclockwise direction and the bearing is rotating slightly in the same direction due to the pivoting action of the flex sprag.

In FIGURE 3, the journal 20 is shown as rotating in a counterclockwise direction. As the journal changes to this counterclockwise direction of rotation, the rounded edge 42 of the lower leg 36 of the flex sprag is frictionally engaged by the outer cylindrical surface 22 of the journal and this leg is urged in the direction of rotation of the journal. Most of the force exerted on the edge 42 is transmitted through the lower leg 36 of the flex sprag to the apex 38 and against the wall 28 of the bearing. A component of this force causes the apex to slide up this wall, thus urging the upper leg 34 of the flex sprag more tightly against the inner cylindrical surface 12 of the housing 10. As the rotation of the journal and the pivoting of the flex sprag continue, the legs 34 and 36 are compressed and a binding condition is reached between the edges 40 and 42 and the corresponding contact surfaces of the housing and the journal. Maximum compression of these legs is obtained when the edges 40 and 42 of these legs are in generally radial alignment with respect to the journal and bearing, as shown in FIGURE 3. Instantaneously, as the binding position shown in FIGURE 3 is reached, the line of contact between the edge 40 and the inner cylindrical surface 12 of the housing becomes the pivoting axis of the flex sprag. The edge 42, which is momentarily bound to the journal moves with the journal, transmitting a force through the apex against the wall 28 of the bearing, thereby causing the bearing to rotate relative to the housing in a counterclockwise direction. Since this binding condition exists momentarily and the resultant force on the bearing is produced simultaneously, the bearing rotates only momentarily. The displacement of the bearing relative to the housing is shown by comparing the position of the walls 28 and 30 relative to the index marks 52 on the housing in both FIGURES 1 and 3.

As the journal continues to rotate in a counterclockwise direction, the flex sprag continues to pivot as the apex 38 slides up the wall 28 of the moving bearing. As a result of this pivoting motion, the flex sprag again comes to a non-binding, non-compressed position as shown in FIGURE 4. In this position, the edge 42 of the lower leg 36 of the flex sprag is ahead of the edge 40 of the upper leg 34 in the direction of journal rotation. The end of the upper leg 34 of the flex sprag is urged against the upper finger 48 of the spring 44 due to the sliding frictional engagement between the edge 42 of the lower leg 36 and the journal. The pressure exerted by the upper finger 48 of the spring 44 prevents the flex sprag from continuing to pivot within the opening. Thus the flex sprag comes to a non-binding, non-compressed position within the opening wherein edges 40 and 42 and the apex 38 are in sliding frictional contact with the corresponding surfaces 12, 22 and 28 respectively, of the housing, journal and bearing. The bearing will not rotate when the flex sprag is in this position as the upper finger 48 of the spring 44 absorbs the force exerted on the flex sprag against the bearing wall 28 due to the frictional engagement between the rotating journal 20 and the edge 42.

Figure 5:
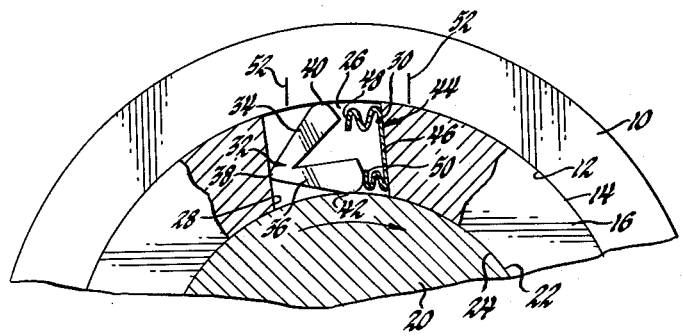
FIGURE 5 is an enlarged fragmentary transverse sectional view similar to FIGURE 3 showing the displacement of the bearing relative to the housing when the journal again reverses direction to rotate in a clockwise direction and the flex sprag has returned to the same relatively static position shown in FIGURE 1.

When the direction of rotation of the journal is again reversed to the clockwise direction shown in FIGURE 5, the flex sprag again pivots in the opening 26 about the edge 42 in contact with the housing 10 through a momentarily binding position, in which the legs 34 and 36 are compressed to a non-binding position, as shown in FIGURE 5. The flex sprag and spring are then in the same position shown in FIGURE 1, but the bearing has been displaced slightly in a counterclockwise direction relative to the housing. However, the bearing is not moved when the flex sprag pivots through this latter binding position as the edge 42 of the lower leg 36 is urged toward and against the lower finger 50 of the spring 44 and the apex 38 slides down the wall 28. This pivoting of the flex sprag does not produce an instantaneous large force on the bearing because of the energy absorption properties of the spring.

Thus it will be noted that the bearing has been rotated to a very small extent relative to the housing when the rotation cycle of the journal is complete. Hence, by a sufficient number of reversals in the direction of rotation of the journal, the bearing will be incrementally rotated through a complete circle, thereby shifting the maximum load-carrying surfaces of the bearing with respect to the load components.

Figure 6:
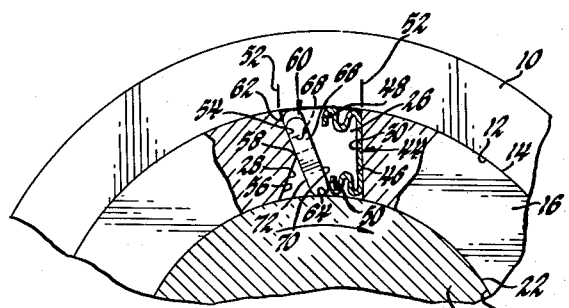
FIGURE 6 is an enlarged fragmentary transverse sectional view showing a modification of the present invention wherein the journal is rotating in a clockwise direction and the camming element is in a relatively static position.

The construction shown in FIGURE 6 is a modification of the embodiment shown in FIGURES 1 through 5, and like parts are indicated by the same reference numerals. In this construction the wall 28 of the bearing 16 formed by the opening 26 has a generally flat, sloping, radially outer section 54 and a generally flat, sloping, radially inner section 56. The outer section 54 and the inner section 56 intersect along a line forming an axially extending apex 58 which protrudes inwardly within the opening. The apex is in constant sliding frictional contact with the camming element 60.

Figure 8:
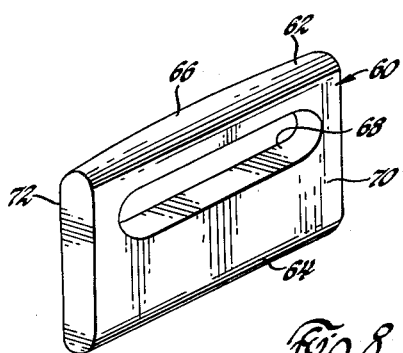
FIGURE 8 is a perspective view of the camming element shown in FIGURES 6 and 7.

As shown in FIGURE 8, the camming element 60 is a flexible metal generally rectangular plate-like element having at least two diametrically opposed transversely, convexly rounded surfaces 62 and 64. As shown in FIGURE 6, one surface, hereinafter designated as the upper surface 62, is in constant sliding frictional contact with the inner cylindrical surface 12 of the housing 10. The other surface, hereinafter designated as the lower surface 64, is in constant sliding frictional contact with the outer cylindrical surface 22 of the journal 20. The upper surface 62 has a slightly raised portion forming a crown 66 with respect to the longitudinally outermost edges of the upper surface. The linear distance between the crown 66 and the lower surface 64 is greater than the radial thickness of the annular wall of the bearing 16. The camming element 60 has an elongated opening 68 extending through the element between a generally flat front face 70 and the generally flat back face 72. The opening 68 is generally parallel to the upper surface 62 and positioned near enough to the upper surface so that the camming element is resiliently compressible in a plane extending through the upper and lower surfaces.

Referring again to FIGURE 6, it will be seen that the axle and the journal 20 are rotating in a clockwise direction. Index marks 52 are shown on the housing 10 aligned with walls 28 and 30 of the bearing 16 formed by the opening 26. These marks are shown to indicate the relative movement of the bearing with respect to the housing in response to a reversal in the direction of journal rotation.

When the journal 20 is rotating in a clockwise direction, the outer cylindrical surface 22 of the journal frictionally engages the rounded lower surface 64 of the camming element 60 and urges a portion of it against the lower finger 50 of the spring 44. The lower finger 50 of the spring is thereby compressed so that it absorbs the force exerted by the lower surface 64 of the camming element against it and the bearing remains stationary relative to the housing. The camming element 60 in this position rests at an angle in the opening so that the back surface 72 of the camming element is in contact with the outer section 54 of the wall 28. Thus the lower surface 64 of the camming element in contact with the journal 20 is ahead of the upper surface 62 of the camming element in contact with the housing 20 in the direction of journal rotation. The camming element 60 in this angular position is in a non-binding, non-compressed condition. However, the force exerted by the compressed lower finger 50 of the spring 44 against the lower surface 64 of the camming element keeps the apex 58 of the bearing wall 28 in constant sliding frictional contact with the back face 72 of the camming element. Since the camming element 60 is substantially less compressible than the spring 44, the camming element will remain in a non-compressed condition in the position described above when the journal is rotating in a clockwise direction. However, the spring 44 will maintain the surfaces 62, 64 and 72 in constant sliding frictional contact with the corresponding surfaces 12, 22 and the apex 58 respectively, while the journal is rotating.

As the journal reverses direction to rotate in a counterclockwise direction, the lower surface 64 of the camming element 60 is frictionally engaged by the outer cylindrical surface 22 of the journal 20 and this surface is urged in the direction of rotation of the journal. Most of the force exerted on the lower surface 64 is transmitted through the camming element to the crown 66 on the upper surface 62 against the inner cylindrical surface 12 of the housing 10 and a binding condition is reached. Maximum compression of the camming element is obtanied when the surfaces 62 and 64 are in generally radial alignment with respect to the journal and bearing. As the binding position is reached, the camming element begins to pivot about an axis defined by the line of contact between the crown 66 of the camming element and the inner cylindrical surface 12 of the housing 10. The lower surface 64 of the camming element, which is momentarily bound to the journal, moves with the journal and simultaneously the back face 72 of the camming element exerts a force against the apex 58 of the bearing wall 28 causing the bearing 16 to rotate in a counterclockwise direction relative to the housing 10. Since this binding condition exists momentarily, the resultant force on the apex of the bearing is produced simultaneously and the bearing rotates only momentarily. The displacement of bearing relative to the housing is shown by comparing the position of the walls 28 and 30 with respect to the index marks 52 in both FIGURES 6 and 7.

Figure 7:
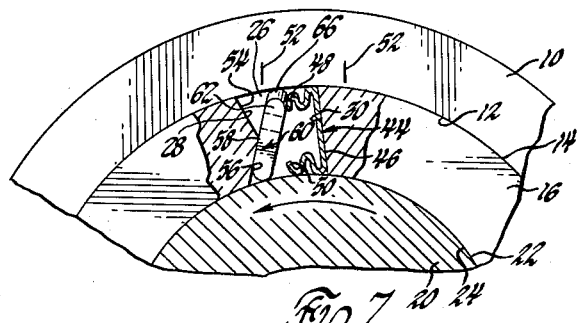
FIGURE 7 is an enlarged fragmentary transverse sectional view of the modification shown in FIGURE 6 wherein the journal is rotating in a counterclockwise direction and the bearing has been displaced relative to the housing and the camming element is in a relatively static position.

As the journal continues to rotate in a counterclockwise direction, the camming element continues to pivot until it again comes to a non-binding, non-compressed condition as shown in FIGURE 7. In this position the lower surface 64 of the camming element is ahead of the upper surface 62 of the camming element in the direction of journal rotation. A portion of the upper surface 62 of the camming element is urged against the upper finger 48 of the spring 44 due to the sliding frictional engagement between the lower surface 64 of the camming element and the journal. In this position a portion of the back face 72 of the camming element is against the inner section 56 of the wall 28. The pressure exerted by the upper finger 48 of the spring 44 prevents the camming element from continuing to pivot within the opening. The bearing will not rotate when the camming element is in this position as the upper finger 48 of the spring member 44 absorbs the force exerted by the camming element against the apex of the bearing wall 28 due to the frictional engagement between the lower surface 64 of the camming element and the rotating journal 20.

When the journal again reverses direction so that it is rotating in a clockwise direction, the camming element again pivots in the opening through a momentarily binding position in which the camming element is compressed to a non-binding position as shown in FIGURE 6. The bearing does not rotate on this latter reversal as the camming element pivots in the reverse direction and the lower surface 64 is urged against the finger 50 of the spring 44, and the back face 72 of the camming element slides in a radially inward direction against the apex 58 of the camming element. Thus it will be noted that the bearing has been unidirectionally and incrementally moved relative to the housing when the rotation cycle of the journal is completed.

Figure 9:
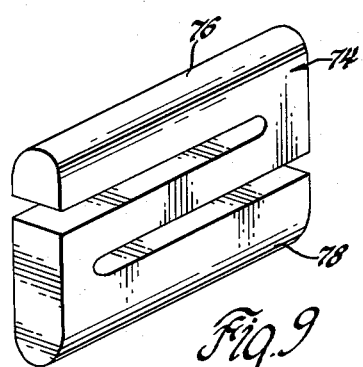
FIGURE 9 is a perspective view of another modification of the camming element for use with the bearing arrangement shown in FIGURES 6 and 7.

FIGURE 9 shows another modification of a camming element 74 adapted to be used in the assembly construction shown in FIGURE 6. The camming element in this case is a flexible metal generally rectangular plate-like, S-shaped member having at least two diametrically opposed transversely, convexly rounded surfaces 76 and 78. The camming element is resiliently compressible in a plane through the upper surface 76 and the lower surface 78 and functions in a manner similar to camming element 60 previously described.

I claim:

1. An assembly comprising a housing, an annular sleeve rotatably supported within said housing, a rotatable member carried by said sleeve and having outer cylindrical surfaces in contact therewith, said rotatable member having a first direction of rotation and a second direction of rotation relative to said housing, an annular wall of said sleeve having an opening extending therethrough in a generally radial direction, a compressible metal camming element located in said opening in contact with said housing, sleeve and rotatable member, and spring means positioned in said opening adapted to exert a pressure on said camming element, said camming element being adapted to frictionally engage said rotatable member when said member is rotating and to impart unidirectional momentary rotational movement to said sleeve relative to said housing in response to a reversal in the direction of rotation of said rotatable member from said first direction to said second direction when said camming element is being urged against said sleeve.

2. A journal and bearing assembly comprising a housing, an annular sleeve bearing rotatably supported within said housing, an axle having a journal portion coaxial with and rotatably mounted in said bearing, said axle having a first direction of rotation and a second direction of rotation relative to said housing, the wall of said bearing having an opening extending therethrough in a generally radial direction, a resiliently compressible metal flex sprag located in said opening in sliding frictional contact with said journal, bearing and housing, said sprag being adapted to be pivoted in said opening in response to a reversal in the direction of journal rotation, and a spring means positioned in said opening, said spring means being adapted to exert a pressure on said sprag, said sprag being adapted to frictionally engage said journal portion of said axle when said axle is rotating and to impart unidirectional momentary rotational movement to said bearing relative to said housing in response to a reversal in the direction of rotation of said journal portion from said first direction to said second direction.

3. A railroad journal and bearing assembly comprising a housing, an annular sleeve bearing rotatably supported within said housing, an axle having a journal portion coaxial with and rotatably mounted in said bearing, said axle having a first direction of rotation and a second direction of rotation relative to said housing, the wall of said bearing having an opening extending therethrough in a generally radial direction, a pivotable compressible metal camming element located in said opening in frictional contact with said housing, bearing and journal, and a spring member positioned in said opening, said spring member being adapted to exert a pressure on said camming element, said camming element being adapted to be pivoted within said opening in response to a reversal in the direction of axle rotation from said first direction to said second direction when said axle is rotating in said first direction, said element being resiliently compressed between said journal and said housing when said element is pivoting, said element being adapted to impart unidirectional and momentary rotational movement to said bearing relative to said housing when said element is pivoting in response to a reversal in the direction of rotation of said journal from said first direction to said second direction and being urged against said bearing due to the frictional engagement between said camming element and said rotating journal.

4. A railroad journal and bearing assembly comprising a stationary housing having a cylindrical inner surface, a sleeve bearing defined by an annular wall having an inner and an outer cylindrical surface, said bearing being rotatably supported within said housing, said inner surface of said housing being in contact with said outer cylindrical surface of said bearing, an axle having a cylindrical journal rotatably supported within said bearing, said axle having a first direction of rotation and a second direction of rotation relative to said housing, said journal being coaxially aligned with said bearing so that its outer cylindrical surface is in circumferential contact with said inner cylindrical surface of said bearing, said annular wall of said bearing having an opening extending therethrough in a generally radial direction, a pivotable compressible metal camming element positioned in said opening, a portion of said camming element being in sliding frictional contact with a wall of said bearing defining said opening, said camming element having at least two edges, a portion of one of said edges being in sliding frictional contact with said inner cylindrical surface of said housing, a portion of another of said edges being in sliding frictional contact with said outer cylindrical surface of said journal, said journal-contacting edge being ahead of said housing-contacting edge in the direction of journal rotation when said journal is so rotating, the distance between said contacting portions of said contacting edges being greater than the thickness of said annular wall of said bearing when said element is not being compressed, and spring means positioned in said opening in contact with a wall of said bearing defining said opening opposite said wall of said bearing in contact with said portion of said camming element, said spring means being adapted to exert a pressure on said portion of said edges when said edges are being urged against said spring means due to the frictional engagement between said journal-contacting edge and said rotating journal, said camming element and said spring means being adapted to impart unidirectional rotational movement to said bearing in response to a reversal in the direction of journal rotation from said first direction to said second direction, said camming element being adapted to be pivoted about an axis parallel to the axis of said journal when the direction of said journal rotation is reversed, said camming element being adapted to be resiliently compressed between said inner cylindrical surface of said housing and said outer cylindrical surface of said journal when said camming element is being pivoted within said opening.

5. A journal and bearing assembly comprising a stationary housing having a cylindrical inner surface, a sleeve bearing defined by an annular wall having an inner and an outer cylindrical surface, said bearing being rotatably supported within said housing, said inner surface of said housing being in circumferential contact with said outer cylindrical surface of said bearing, an axle having a cylindrical journal rotatably supported within said bearing, said axle having a first direction of rotation and a second direction of rotation relative to said housing, said journal being coaxially aligned with said bearing so that its outer cylindrical surface of said journal is in circumferential contact with said inner cylindrical surface of said bearing, said annular wall of said bearing having an opening extending therethrough in a generally radial direction, a pivotable compressible metal V-shaped camming element positioned in said opening, said V-shaped camming element having a radially upper leg and a radially lower leg meeting at an apex, said legs having rounded outer edges, the apex of said V-shaped camming element being in sliding frictional contact with a wall of said bearing defining said opening, a portion of said outer edge of said radially upper leg being in sliding frictional contact with said inner cylindrical surface of said housing, a portion of said outer edge of said radially lower leg being in sliding frictional contact with said outer cylindrical surface of said journal, said journal-contacting edge being ahead of said housing-contacting edge in the direction of journal rotation when said journal is so rotating, the distance between said contacting portions of said contacting edges being greater than the thickness of said annular wall of said bearing when said element is not being compressed, and a resilient U-shaped spring member positioned in said opening, a generally flat base portion of said spring member being in contact with a wall of said bearing defining said opening opposite said wall of said bearing in contact with said apex of said V-shaped camming element, said spring member having a radially upper finger and a radially lower finger, said fingers of said spring member inwardly protruding within said opening, said radially upper finger of said spring member adapted to exert a pressure against a portion of said edge of said radially upper leg of said camming element when said radially upper leg of said camming element is being urged against said radially upper finger of said spring member, said radially lower finger of said spring member being adapted to exert a pressure against a portion of said edge of said radially lower leg of said camming element when said radially lower leg of said camming element is being urged against said radially lower finger of said spring member due to the frictional engagement between said radially lower leg of said camming element and said rotating journal, said camming element and said spring member being adapted to impart unidirectional rotational movement to said bearing in response to a reversal in the direction of journal rotation from said first direction to said second direction, said camming element being adapted to be pivoted about an axis parallel to the axis of said journal when the direction of said journal rotation is reversed, said legs of said camming element being adapted to be resiliently compressed between said inner cylindrical surface of said housing and said outer cylindrical surface of said journal when said camming element is being pivoted within said opening.

6. A journal bearing assembly comprising a stationary housing having a smooth cylindrical inner surface, a sleeve bearing defined by an annular wall having an inner and an outer cylindrical surface, said bearing being rotatably supported within said housing, said inner surface of said housing being in circumferential contact with said outer cylindrical surface of said bearing, an axle having a cylindrical journal rotatably supported within said bearing, said axle having a first direction of rotation and a second direction of rotation relative to said housing, said journal being coaxially aligned with said bearing so that the outer cylindrical surface of said journal is in circumferential contact with said inner cylindrical surface of said bearing, said annular wall of said bearing having an opening defined by sides extending therethrough in a generally radial direction, one of said sides of said opening being defined by two intersecting walls forming an apex inwardly protruding within said opening, a pivotable compressible metal generally rectangular camming element positioned in said opening, said camming element having at least two rounded edges, said camming element being in sliding frictional contact with said apex, a portion of one of said edges being in sliding frictional contact with said inner cylindrical surface of said housing, a portion of another of said edges being in sliding frictional contact with said outer cylindrical surface of said journal, said journal-contacting edge being ahead of said housing-contacting edge in the direction of journal rotation when said journal is rotating in said first direction and said journal-contacting edge being in the second direction of rotation when said journal is rotating in said second direction, the distance between said contacting portions of said contacting edges being greater than the thickness of said annular wall of said bearing when said element is not being compressed, and a resilient U-shaped spring member positioned in said opening, a generally flat base portion of said spring member being in contact with a side of said bearing opposite said side of said bearing having said apex in contact with said camming element, said spring member having a radially upper finger and a radially lower finger, said fingers of said spring member inwardly protruding within said opening, said radially upper finger adapted to exert a pressure against a portion of said housing-contacting edge when said housing-contacting edge is urged against said radially upper finger of said spring member, said radially lower finger of said spring member being adapted to exert a pressure against a portion of said journal-contacting edge when said journal-contacting edge is being urged against said radially lower finger of said spring member due to the frictional engagement between said journal-contacting edge of said camming element and said rotating journal, said camming element and said spring member being adapted to impart a unidirectional rotational movement to said bearing in response to a reversal in the direction of journal rotation from said first direction to said second direction, said camming element being adapted to be pivoted about an axis parallel to the axis of said journal when the direction of said journal rotation is reversed, said edges of said camming element being adapted to be resiliently compressed between said inner cylindrical surface of said housing and said outer cylindrical surface of said journal when said camming element is being pivoted within said opening.

7. A journal and bearing assembly comprising a stationary housing having a smooth cylindrical inner surface, a sleeve bearing defined by an annular wall having inner and outer cylindrical surfaces, said bearing being rotatably supported within said housing so that said inner surface of said housing is in circumferential contact with said outer surface of said bearing, an axle having a journal defined by an outer cylindrical surface, said axle having a first direction of rotation and a second direction of rotation relative to said housing, said journal being rotatably supported within said bearing, said inner cylindrical surface of said bearing being in circumferential contact with said outer cylindrical surface of said journal, said annular wall of said bearing having an opening extending therethrough in a generally radial direction, a pivotable, resilient metal camming element having at least two rounded edges positioned in said opening, a portion of said camming element being in constant sliding frictional contact with a wall of said bearing defining said opening, one of said edges being in constant sliding frictional contact with said outer cylindrical surface of said journal, another of said edges being in constant sliding frictional contact with said inner cylindrical surface of said housing, and a resilient spring member positioned in said opening adjacent a wall of said bearing defining said opening opposite said wall in contact with said portion of said camming element, said spring member being adapted to exert a pressure against said edges of said camming element when said edges are urged against said spring member due to the frictional engagement between said journal-contacting edge and said journal when said journal is rotating, said camming element being adapted to be pivoted between a first and second position, said journal-contacting edge being ahead of said housing-contacting edge and said camming element being in said first position when said journal is rotating in said first direction and said journal-contacting edge being ahead of said housing-contacting edge and said camming element being in said second position when said journal is rotating in said second direction, said camming element being in said first position when a portion of said journal-contacting edge is being urged against said spring member and said spring member is resiliently depressed, said camming element being movable from said first position to said second position by pivoting in said opening in response to a reversal in the direction of journal rotation from said first direction to said second direction, said camming element being resiliently compressed between said inner circumferential surface of said housing and said outer circumferential surface of said journal when said element is pivoting, said camming element exerting a force against said bearing wall in contact with said portion of said element when said element is pivoting, said force imparting unidirectional incremental rotational movement to said bearing in the direction of journal rotation when said element is pivoting in response to a reversal in the direction of rotation of said journal from said first direction to said second direction, said camming element being in said second position when a portion of the edge of said element contacting said housing surface is being urged against said spring member to resiliently depress said spring member.

References Cited by the Examiner

UNITED STATES PATENTS

| | | | |
|---|---|---|---|
| 1,899,691 | 2/1933 | Jablow. | |
| 2,389,961 | 11/1945 | Dodge | 192—45.1 |
| 2,599,793 | 6/1952 | Warner | 192—45.1 |
| 3,049,205 | 8/1962 | Ferris | 192—45.1 |

ROBERT C. RIORDON, *Examiner.*

D. C. CHAMPION, *Assistant Examiner.*

DAVID J. WILLIAMOWSKY, *Primary Examiner.*